United States Patent
Hofmann et al.

(10) Patent No.: US 8,349,441 B2
(45) Date of Patent: Jan. 8, 2013

(54) PYROGENIC TITANIUM DIOXIDE COMPRESSED TO SLUGS

(75) Inventors: Ralph Hofmann, Buchen (DE); Guenter Stein, Nidderau (DE); Frank Menzel, Hanau-Steinheim (DE)

(73) Assignee: Evonik Degussa GmbH, Essen (DE)

( * ) Notice: Subject to any disclaimer, the term of this patent is extended or adjusted under 35 U.S.C. 154(b) by 640 days.

(21) Appl. No.: 12/438,813

(22) PCT Filed: Aug. 9, 2007

(86) PCT No.: PCT/EP2007/058289
§ 371 (c)(1),
(2), (4) Date: Jun. 8, 2009

(87) PCT Pub. No.: WO2008/025663
PCT Pub. Date: Mar. 6, 2008

(65) Prior Publication Data
US 2009/0280309 A1    Nov. 12, 2009

(30) Foreign Application Priority Data

Aug. 30, 2006 (DE) .................. 10 2006 040 591

(51) Int. Cl.
*B01J 21/06* (2006.01)
(52) U.S. Cl. .............. 428/219; 502/242; 502/439

(58) Field of Classification Search .................. None
See application file for complete search history.

(56) References Cited

U.S. PATENT DOCUMENTS

| | | | |
|---|---|---|---|
| 4,482,642 A | 11/1984 | Ettlinger et al. | |
| 5,484,481 A | 1/1996 | Linde et al. | |
| 6,413,490 B1 | 7/2002 | Hilmar et al. | |
| 2006/0159636 A1 | 7/2006 | Meyer et al. | |

FOREIGN PATENT DOCUMENTS

| | | | |
|---|---|---|---|
| CA | 2312249 | * | 12/2000 |
| DE | 3314090 | | 9/1983 |
| DE | 4041137 | | 6/1992 |
| DE | 43 36 613 | | 2/1995 |
| DE | 19600615 | | 7/1997 |
| DE | 199 28 851 | | 12/2000 |
| EP | 0 492 238 | | 7/1992 |
| EP | 1 813 574 | | 8/2007 |

* cited by examiner

*Primary Examiner* — David Sample
*Assistant Examiner* — Nicole T Gugliotta
(74) *Attorney, Agent, or Firm* — Oblon, Spivak, McClelland, Maier & Neustadt, L.L.P.

(57) ABSTRACT

Pyrogenic titanium dioxide is compressed to slugs by preliminarily deaerating it, compressing it to slugs, and crushing the slugs and optionally classifying them. The slugs are characterized by a tamped density (to DIN EN ISO 787-11) of 500 to 1200 g/l.

13 Claims, 7 Drawing Sheets

Fig. 1

Fig. 2

Schematic setup of the sedimentation dust measurement unit

Fig. 3

Figure 4:
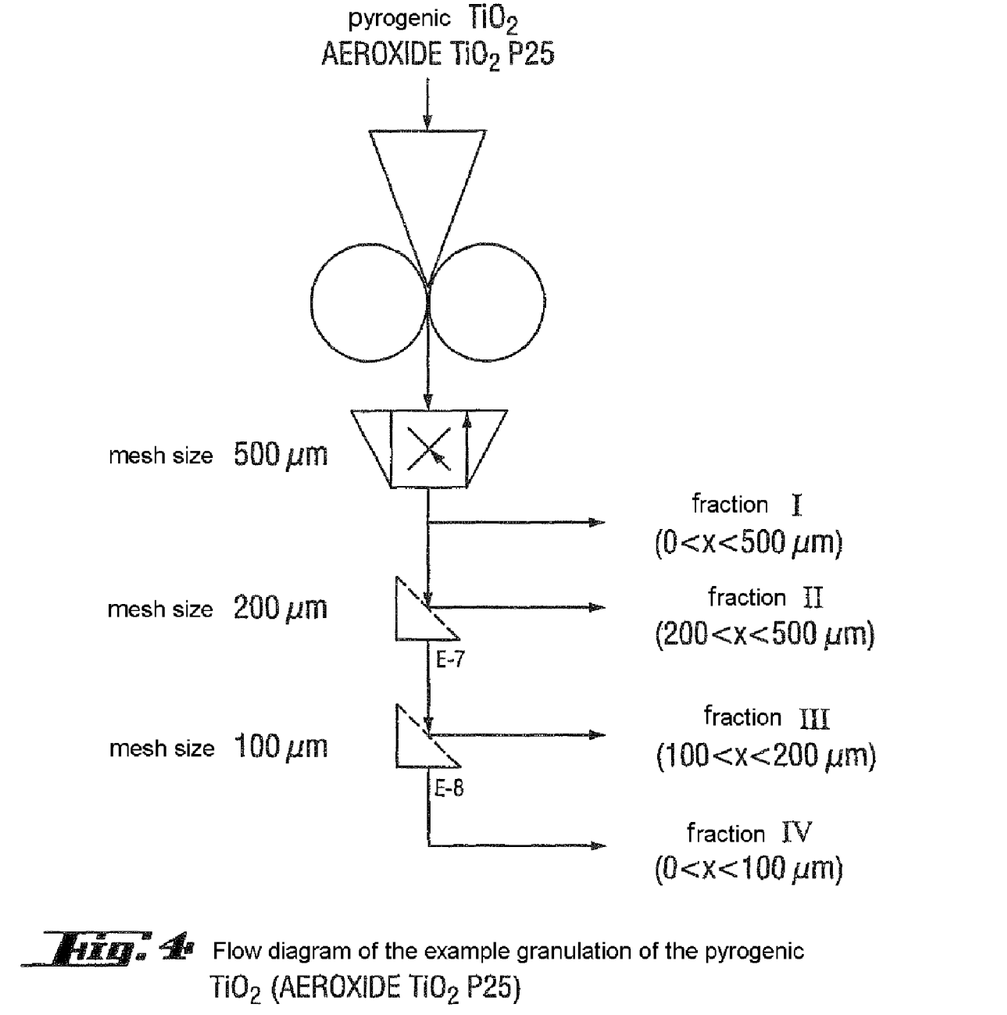

Fig. 4: Flow diagram of the example granulation of the pyrogenic $TiO_2$ (AEROXIDE $TiO_2$ P25)

Figure 5:
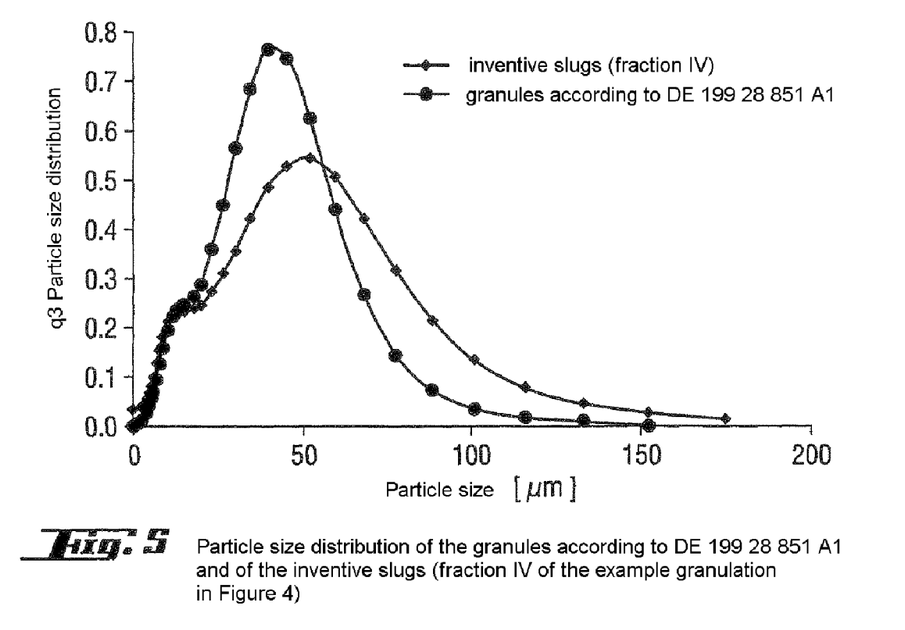

Fig. 5  Particle size distribution of the granules according to DE 199 28 851 A1 and of the inventive slugs (fraction IV of the example granulation in Figure 4)

Figure 6:
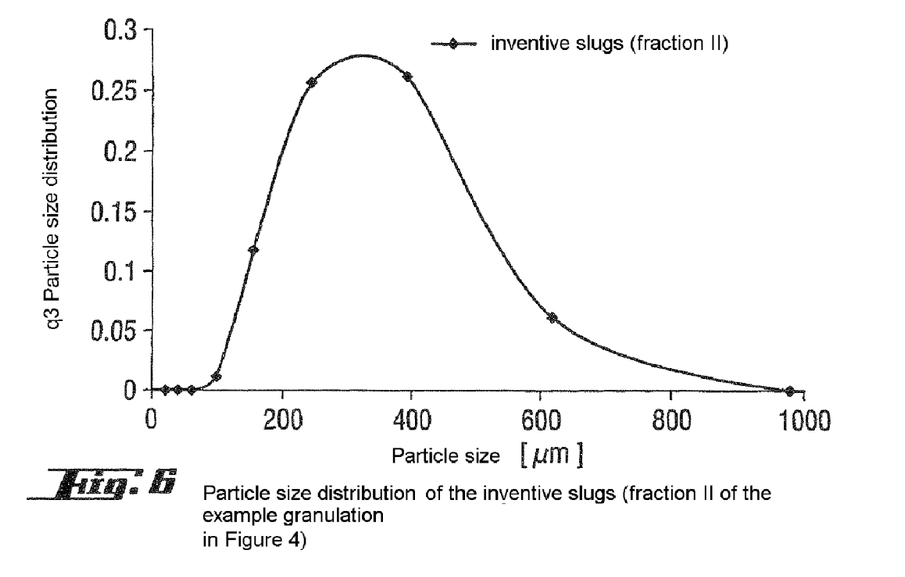

Fig. 6  Particle size distribution of the inventive slugs (fraction II of the example granulation in Figure 4)

Figure 7:
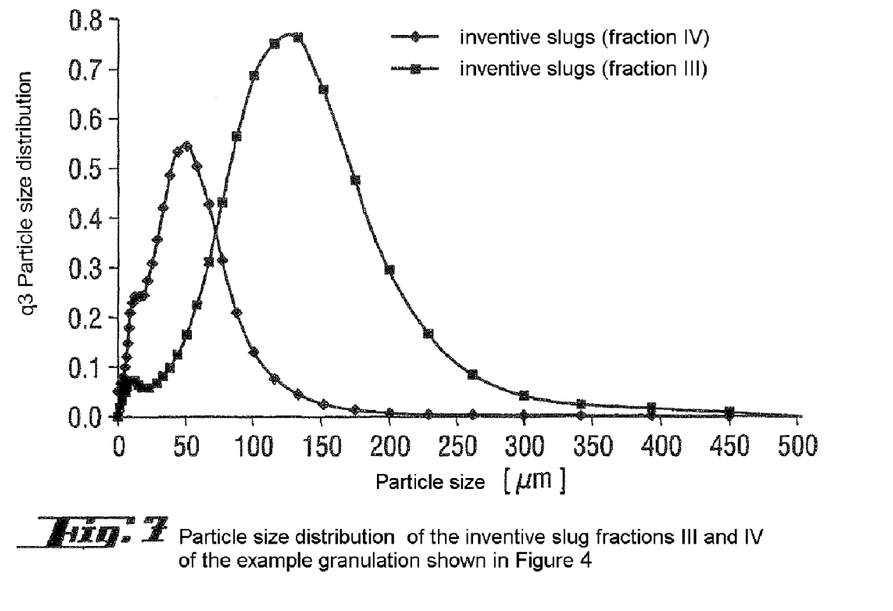

Fig. 7 Particle size distribution of the inventive slug fractions III and IV of the example granulation shown in Figure 4

Figure 8:
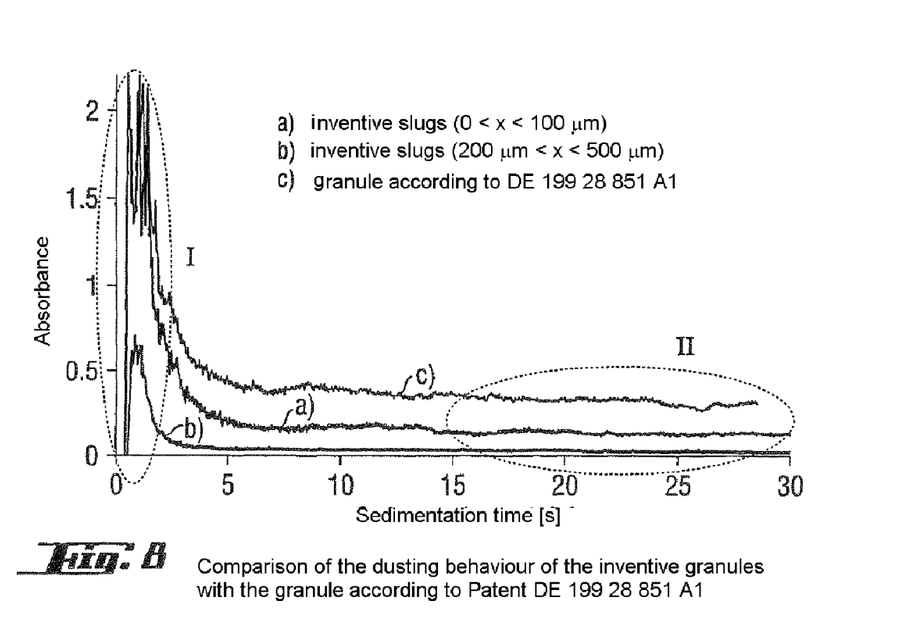

Fig. 8 Comparison of the dusting behaviour of the inventive granules with the granule according to Patent DE 199 28 851 A1

Figure 9:
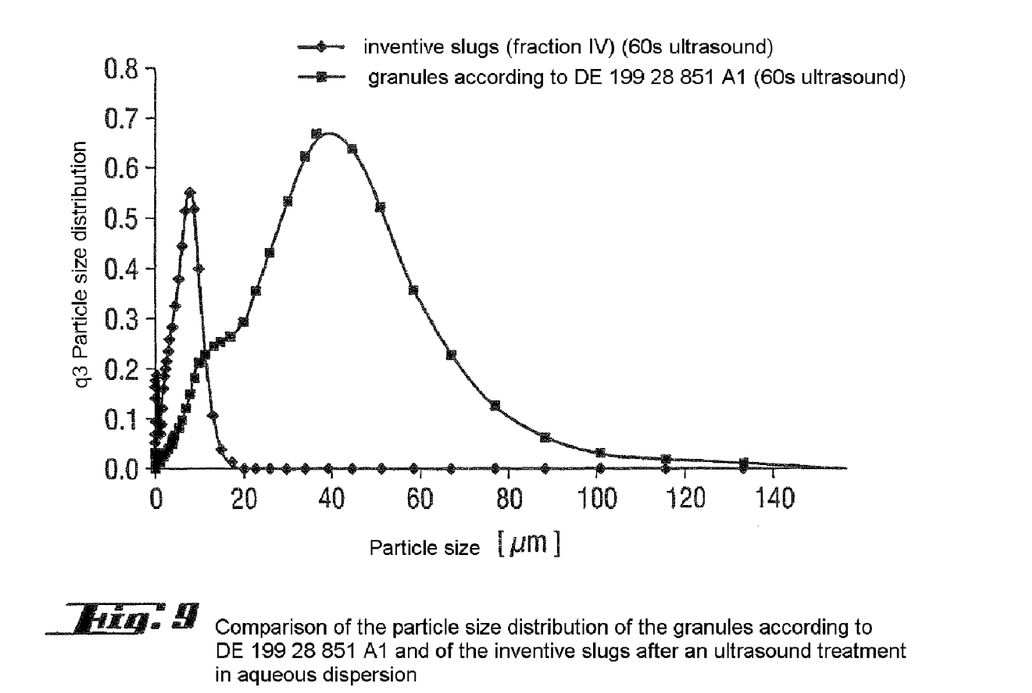

Fig. 9 Comparison of the particle size distribution of the granules according to DE 199 28 851 A1 and of the inventive slugs after an ultrasound treatment in aqueous dispersion

PYROGENIC TITANIUM DIOXIDE COMPRESSED TO SLUGS

The invention relates to pyrogenic titanium dioxide compressed to slugs, to a process for producing the slugs of pyrogenic titanium dioxide, and to their use.

It is known that pyrogenic titanium dioxide can be prepared by means of high temperature or flame hydrolysis from $TiCl_4$ or other evaporable titanium compounds (Ullmann's Enzyklopädie der technischen Chemie, 4th Edition, Volume 21, page 464 (1982).

Pyrogenic titanium dioxides feature extremely fine particles, a low bulk density, high specific surface area, very high purity, spherical particle form and the absence of pores.

The compression of pyrogenic titanium dioxide is difficult without binders because pyrogenic titanium dioxide is very dry, and no capillary forces can bring about the particle binding.

The pyrogenic titanium dioxide frequently has a high surface charge which complicates the agglomeration electrostatically.

For particular applications, it is known that pyrogenic silicon dioxides can be compressed or shaped to granules.

It is known that pyrogenic titanium dioxide can be shaped to titanium dioxide pellets by mixing pyrogenic titanium dioxide with a moistening agent, a binder, a base and a reshaping assistant, and extruding this mixture, drying the extrudates and calcining them (DE 40 12 479 A1).

It is also known that pyrogenic titanium dioxide can be shaped to pellets by compressing the pyrogenic titanium dioxide with urea, graphite and water, drying the mixture, comminuting it, then extruding or tableting it, and heat-treating the resulting pellets (EP 0 394 677 A1).

In addition, pellets of pyrogenic titanium dioxide which can be used as catalyst supports are described in DE 38 03 894 A1.

It is also known that pyrogenic titanium dioxide can be shaped to granules by dispersing the titanium dioxide in water and spray-drying it. These granules can be used, inter alia, as catalyst supports (DE 199 28 851 A1).

The known pellets have the disadvantage that they are not redispersible or comprise further constituents as well as the titanium dioxide.

It is an object of the invention to compress pyrogenic titanium dioxide so as to obtain a free-flowing product with defined particle size, good meterability, high bulk density, low dust content and good redispersibility.

The invention provides pyrogenic titanium dioxide compressed to slugs, characterized in that it has a tamped density (to DIN EN ISO 787-11) of 500 to 1200 g/l.

In a preferred embodiment of the invention, the tamped density (to DIN EN ISO 787-11) may be 600 to 800 g/l.

According to the invention, the slugs of the pyrogenic titanium dioxide can be classified into various fractions as follows:

Fraction I: $0<x<500$ µm with a tamped density of 678 g/l
Fraction II: $200$ µm$<x<500$ µm with a tamped density of 702 g/l
Fraction III: $100$ µm$<x<200$ µm with a tamped density of 606 g/l
Fraction IV: $0<x<100$ µm with a tamped density of 605 g/l In a preferred form of the invention, the pyrogenic titanium dioxide compressed to slugs may have a particle size of 200 µm$<x<500$ µm and a tamped density of 702 g/l (fraction II).

This fraction exhibits excellent free-flow properties and a very low dust content.

Slugs refer to the more or less elongated intermediate products which form in the roll compression through the compression of the starting material. They are optionally comminuted in a second step.

The slug properties can be influenced by the procedural parameters, such as the given process control mode, the compressing force, the width of the gap between the two rollers and the pressure hold time which is established through the corresponding change in the rotational speeds of the compression rollers.

Compression is understood to mean mechanical compression without addition of binders. In a particular embodiment of the invention, the slugs have a defined shape, and the size distribution can be adjusted by means of screening.

The inventive pyrogenic titanium dioxide compressed to slugs has a high transport stability.

The invention further provides a process for preparing pyrogenic titanium dioxide compressed to slugs and having a tamped density (to DIN EN ISO 787-11) of 500 to 1200 g/l, which is characterized in that pyrogenic titanium dioxide is optionally preliminarily deaerated and/or compressed, and compressed to slugs, and the slugs are crushed and optionally classified.

The process according to the invention is illustrated in detail with reference to the drawings.

Figure 1:
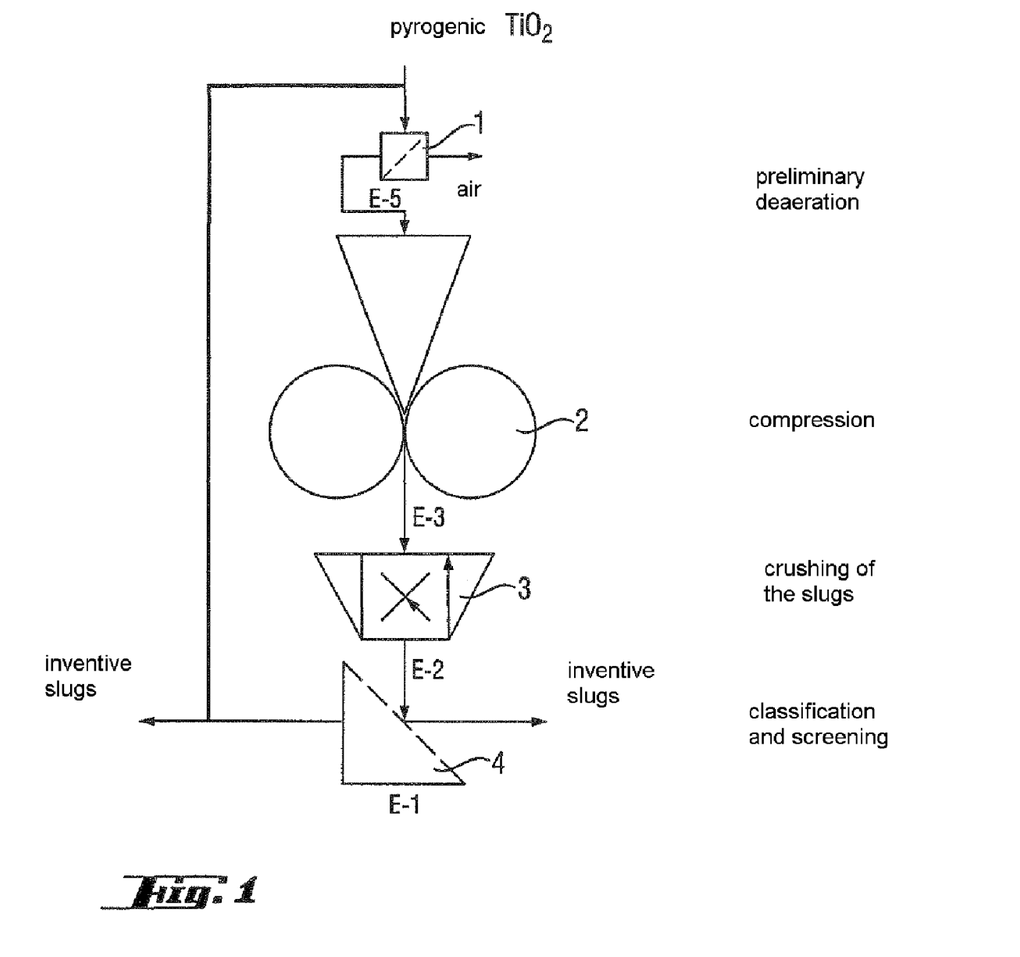

According to FIG. 1, the pyrogenic titanium dioxide can be deaerated or precompressed in the preliminary deaerator 1.

The optionally preliminarily deaerated titanium dioxide is compressed by means of the compressor 2 to slugs. The resulting slugs are crushed by means of the apparatus for crushing the slugs 3 and then classified or screened by means of the classifying apparatus 4.

Figure 2:
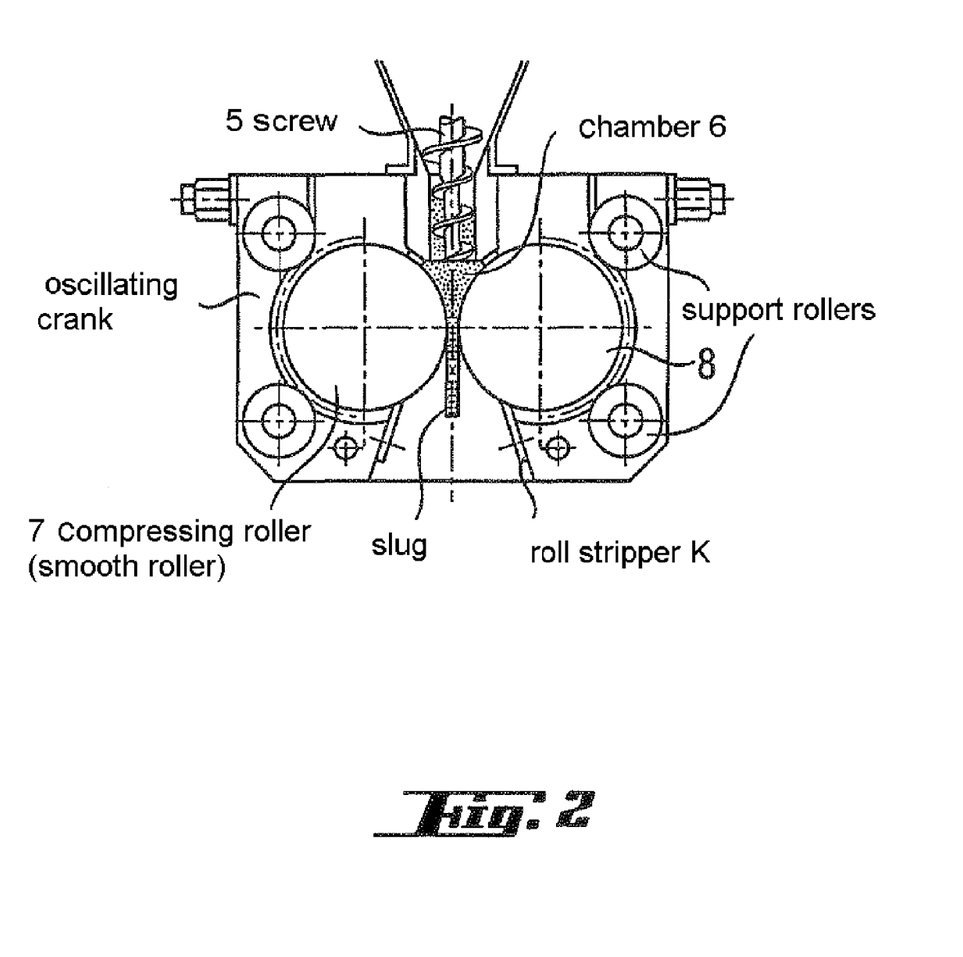

According to FIG. 2, which shows the compressor 2 schematically, the titanium dioxide is introduced by means of the screw 5 into the chamber 6, whence it is entrained by means of the two rollers 7 and 8 and compressed to slugs.

When an already precompressed pyrogenic titanium dioxide is used, it is possible to dispense with this step of preliminary deaeration. The precompression can be effected, for example, by means of a vacuum pressure belt filter. The vacuum pressure belt filter is known from EP 0 280 851 A1.

The preliminarily deaerated pyrogenic titanium dioxide is compressed (compacted) to the desired tamped density in the "compression" step.

After the compression, the slugs are crushed. If appropriate, it is subsequently possible to classify or screen them.

The fines which are obtained in the screening can be recycled into the preliminary deaeration step.

According to the invention, the starting material used in the preliminary deaeration may be an uncompressed or a precompressed titanium dioxide.

The preliminary deaeration can be performed before the transport or during the transport to the compression.

Before the transport to the compression, the preliminary deaeration can be effected by means of a pipe made of a sintered material, for example sintered metal, to which vacuum is applied.

Preliminary deaeration can also be effected in the transport screw, in which case the transport screw can be connected downstream of the apparatus which comprises a tube to which vacuum is applied.

In a further embodiment of the invention, the transport screw may be used as the sole apparatus for preliminary deaeration.

Moreover, the preliminary deaeration can also be effected by means of a transport screw which is arranged within a tube to which vacuum is applied. The tube to which vacuum is applied may consist of a sintered material, for example sintered metal.

When the apparatus consists of a preliminary deaeration tube, for example a tube to which vacuum is applied, and a transport screw connected downstream, the preliminary deaeration can be effected in the tube when uncompressed titanium dioxide is used.

When precompressed titanium dioxide is used, the preliminary deaeration can likewise be effected in the tube. It is also possible to dispense with this preliminary deaeration step.

When the apparatus which has a transport screw within a tube to which vacuum is applied is used for preliminary deaeration, both uncompressed titanium dioxide and precompressed titanium dioxide can be used.

The preliminary deaeration of the pyrogenic titanium dioxide can also be effected by means of filtration on a filter medium, for example a cloth or sintered material, for example sintered metal, sintered plastic, sintered ceramic, porous glass, with continuous filtercake removal by means, for example, of a conveying screw or a scraper. In one embodiment of the invention, a sintered metal tube with a metering screw can be used.

The preliminary deaeration can also be effected by means of sedimentation.

The starting material used may be hydrophilic pyrogenic titanium dioxide or hydrophobic pyrogenic titanium dioxide.

The hydrophobic pyrogenic titanium dioxide can be prepared by means of surface modification.

The surface modification can be effected with one or more compounds from the following group:

a) organosilanes of the $(RO)_3Si(C_nH_{2n+1})$ and $(RO)_3Si(C_nH_{2n-1})$ type
   R=alkyl, for example methyl, ethyl, n-propyl, isopropyl, butyl
   n=from 1 to 20 b) organosilanes of the $R'_x(RO)_ySi(C_nH_{2n+1})$ and $R'_x(RO)_ySi(C_nH_{2n-1})$ type
   R=alkyl, for example methyl, ethyl, n-propyl, isopropyl, butyl
   R'=alkyl, for example methyl, ethyl, n-propyl, isopropyl, butyl
   R'=cycloalkyl
   n=from 1 to 20
   x+y=3
   X=1, 2
   y=1, 2 c) haloorganosilanes of the $X_3Si(C_nH_{2n+1})$ and $X_3Si(C_nH_{2n-1})$ type
   X=Cl, Br
   n=from 1 to 20 d) haloorganosilanes of the $X_2(R')Si(C_nH_{2n+1})$ and $X_2(R')Si(C_nH_{2n-1})$ type
   X=Cl, Br
   R'=alkyl, for example methyl, ethyl, n-propyl, isopropyl, butyl
   R'=cycloalkyl
   n=from 1 to 20 e) haloorganosilanes of the $X(R')_2Si(C_nH_{2n+1})$ and $X(R')_2Si(C_nH_{2n-1})$ type
   X=Cl, Br
   R'=alkyl, for example methyl, ethyl, n-propyl, isopropyl, butyl
   R'=cycloalkyl
   n=from 1 to 20 f) organosilanes of the $(RO)_3Si(CH_2)_n$—R' type
   R=alkyl, such as methyl, ethyl, propyl
   m=0, from 1 to 20
   R'=methyl, aryl (e.g. —$C_6H_5$, substituted phenyl radicals)
   —$C_4F_9$, $OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—$(CH_2$—$CH_2$—$NH_2)_2$
   —OOC$(CH_3)$C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si—$(OR)_3$
   —$S_x$—$(CH_2)_3$Si$(OR)_3$, where X=from 1 to 10 and R may be alkyl, such as methyl, ethyl, propyl, butyl
   —SH
   —NR'R''R'''(R'=alkyl, aryl; R''=H, alkyl, aryl; R'''=H, alkyl, aryl, benzyl, $C_2H_4$NR''''R''''', where R''''=A, alkyl and R'''''=H, alkyl)

g) organosilanes of the $(R'')_x(RO)_ySi(CH_2)_m$—R' type $R''$ = alkyl
    = cycloalkyl
$x + y = 1, 2$
$x = 1, 2$
$y = 1, 2$
$m = 0$, from 1 to 20

R'=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$,
   —$NH_2$, —$N_3$, —SCN, —CH=$CH_2$, —NH—$CH_2$—$CH_2$—$NH_2$,
   —N—$(CH_2$—$CH_2$—$NH_2)_2$,
   —OOC$(CH_3)$C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si—$(OR)_3$
   —$S_x$—$(CH_2)_3$Si$(OR)_3$, where X=from 1 to 10 and R may be methyl, ethyl, propyl, butyl SH
   —NR'R''R''' (R'=alkyl, aryl; R''=H, alkyl, aryl; R'''=H, alkyl, aryl, benzyl, $C_2H_4$NR''''R''''', where R''''=A, alkyl and R'''''=H, alkyl)

h) haloorganosilanes of the $X_3Si(CH_2)_m$—R' type
   X=Cl, Br
   m=0, from 1 to 20
   R'=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$,
   —NH—$CH_2$—$CH_2$—$NH_2$
   —N—$(CH_2$—$CH_2$—$NH_2)_2$,
   —OOC$(CH_3)$C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si—$(OR)_3$
   —$S_x$—$(CH_2)_3$Si$(OR)_3$, where X=from 1 to 10 and R may be methyl, ethyl, propyl, butyl
   —SH i) haloorganosilanes of the $(R)X_2Si(CH_2)_m$—R' type
   X=Cl, Br
   R=alkyl, e.g. methyl, ethyl, propyl m=0, from 1 to 20

R'=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—($CH_2$—$CH_2$—$NH_2$)$_2$
   —OOC($CH_3$)C=$CH_2$
   —$OCH_2$—CH(O)$CH_2$
   —NH—CO—N—CO—($CH_2$)$_5$
   —NH—COO—$CH_3$, —NH—COO—$CH_2$—$CH_3$, —NH—($CH_2$)$_3$Si—(OR)$_3$,
   where R can be methyl, ethyl, propyl, butyl —$S_x$—($CH_2$)$_3$Si(OR)$_3$, where R can be methyl, ethyl, propyl, butyl and X can be from 1 to 10
   —SH j) haloorganosilanes of the (R)$_2$XSi($CH_2$)$_m$—R' type
   X=Cl, Br
   R=alkyl, such as methyl, ethyl, propyl, butyl
   m=0, from 1 to 20
   R'=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—($CH_2$—$CH_2$—$NH_2$)$_2$,
   —OOC($CH_3$)C=$CH_2$
   —$OCH_2$—CH(O)$CH_2$
   —NH—CO—N—CO—($CH_2$)$_5$
   —NH—COO—$CH_3$, —NH—COO—$CH_2$—$CH_3$, —NH—($CH_2$)$_3$Si—(OR)$_3$.
   —$S_x$—($CH_2$)$_3$Si(OR)$_3$, where X=from 1 to 10 and R can be methyl, ethyl, propyl, butyl
   —SH k) silazanes of the type
   R=alkyl
   R'=alkyl, vinyl l) cyclic polysiloxanes of the D 3, D 4, D 5 type, where D 3, D 4 and D 5 are cyclic polysiloxanes having 3, 4 or 5 units of the —O—Si($CH_3$)$_2$— type. For example, octamethylcyclotetrasiloxane=D 4 m) polysiloxanes or silicone oils of the type m=0, 1, 2, 3, ... ∞
n=0, 1, 2, 3, ... ∞
u=0, 1, 2, 3, ... ∞
Y=$CH_3$, H, $C_nH_{2n+1}$ n=1-20
Y=Si($CH_3$)$_3$, Si($CH_3$)$_2$H
   Si($CH_3$)$_2$OH, Si($CH_3$)$_2$(O$CH_3$)
   Si($CH_3$)$_2$($C_nH_{2n+1}$) n=1-20
R=alkyl, such as $C_nH_{2n+1}$, where n=from 1 to 20, aryl, such as
   phenyl and substituted phenyl radicals, ($CH_2$)$_n$—$NH_2$, H
R'=alkyl, such as $C_nH_{2n+1}$, where n=from 1 to 20, aryl, such as
   phenyl and substituted phenyl radicals, ($CH_2$)$_n$—$NH_2$, H
R''=alkyl, such as $C_nH_{2n+1}$, where n=from 1 to 20, aryl, such as
   phenyl and substituted phenyl radicals, ($CH_2$)$_n$—$NH_2$, H
R'''=alkyl, such as $C_nH_{2n+1}$, where n=from 1 to 20, aryl, such as
   phenyl and substituted phenyl radicals, ($CH_2$)$_n$—$NH_2$, H.

The pyrogenic titanium dioxide can be used directly from the silo as the starting material in the uncompressed state. In that case, it may have a tamped density (to DIN EN ISO 787-11) of 40 to 60 g/l.

Moreover, the pyrogenic titanium dioxide, when it is taken from containers and used as the starting material, may have a tamped density (to DIN ISO 787-11) of 50 to 250 g/l.

Moreover, the pyrogenic titanium dioxide, once compressed, for example by means of a vacuum pressure belt filter, and used as the starting material, may have a tamped density (to DIN EN ISO 787-11) of 250 to 450 g/l.

The pyrogenic titanium dioxide compressed from these starting materials may have a tamped density of 500 to 1200 g/l.

When the pyrogenic titanium dioxide is used as the starting material in hydrophobized form, it may have, in the uncompressed state, a tamped density (to DIN EN ISO 787-11) of 40 to 250 g/l.

The hydrophobized pyrogenic titanium dioxide may have, in the precompressed state, a tamped density of 150 to 450 g/l.

The precompression can be effected, for example, by means of a vacuum pressure belt filter. The vacuum pressure belt filter is known from EP 0 280 851 A1.

The hydrophobized pyrogenic titanium dioxide can be compressed by means of a compressor to a tamped density (to DIN EN ISO 787-11) of 500 to 1200 g/l.

The pyrogenic titanium dioxide used may have a primary particle size of 5 to 50 nm and a BET surface area of 30 to 150 m²/g, preferably 35 to 65 m²/g.

The water content of the pyrogenic titanium dioxide used may be less than 1.5% by weight.

The pyrogenic titanium dioxide may be precompressed by means of known processes and apparatus. For example, the apparatus according to U.S. Pat. No. 4,325,686, U.S. Pat. No. 4,877,595, U.S. Pat. No. 3,838,785, U.S. Pat. No. 3,742,566, U.S. Pat. No. 3,762,851, U.S. Pat. No. 3,860,682 can be used.

In a preferred embodiment of the invention, a pyrogenic titanium dioxide which has been precompressed by means of a pressure belt filter according to EP 0 280 851 B1 or U.S. Pat. No. 4,877,595 can be used.

The pyrogenic titanium dioxide can be transported to the compression, for example, by means of a screw.

This transport is forced conveying of the pyrogenic titanium dioxide into the roller gap of the compressing rollers.

When a conveying screw is used, the pyrogenic titanium dioxide cannot be precompressed because a preliminary deaeration takes place here.

To achieve high bulk densities of the slugs, a conveying screw and precompressed pyrogenic titanium dioxide can be used.

The conveying screw used may be a screw with decreasing volume or with increasing pitch or with decreasing diameter.

The conveying screw may be surrounded by a tube to which vacuum is applied. This tube may consist of a sintered material. The preliminary deaeration of the titanium dioxide is effected here in the transport screw simultaneously with the transport into the roller gap.

The compression to slugs can be effected by means of two rollers of which one or else both may simultaneously have a deaeration function.

It is possible with preference to use two compressing rollers which may be smooth. They may also be profiled. The profile may be present either only on one compressing roller or on both compressing rollers.

The profile may consist of axially parallel grooves. Alternatively, it may be composed of recesses (depressions) in any configuration.

In a further embodiment of the invention, at least one of the rollers may be a vacuum roller. In this embodiment, the rollers may be covered with sintered metal.

In order to be able to accomplish the deaeration function, the roller may be produced from sintered metal or be covered with a filter medium, for example with a cloth.

If deaeration of the pyrogenic titanium dioxide is possible by means of the rollers, it is possible to dispense with the additional preliminary deaeration which can be effected in the conveying screw or the feed tube.

When the roller is used for preliminary deaeration, the roller may have a smooth or profiled surface, and this surface may be grooved only slightly in order to improve the product intake.

The compression should ensure uniform pressing of the pyrogenic titanium dioxide in order to obtain slugs with a uniform density.

To perform the process according to the invention, it is also possible to use an apparatus as described in document DE-B 1 807 714.

Preference is given to using smooth rollers in the compression in order to avoid grit. It is also possible to use one or two rollers made of sintered material, such as sintered metal or sintered ceramic, through which deaeration can be effected.

After the compression, the slugs are crushed. For this purpose, a screen granulator which defines the particle size by its mesh size of the screen can be used. The mesh size may be 50 μm to 20 mm, preferably greater than 200 μm.

For the crushing of the slugs, it is also possible to use an apparatus with two contrarotary rollers with a defined gap, or a toothed roller.

The crushed slugs can be classified by means of a sifter, of a screen or of a classifier. This can remove the fines (particles smaller than 200 μm).

The sifters used may be crossflow sifters, countercurrent deflection sifters, etc.

The classifier used may be a cyclone.

The fines removed in the classification (particles smaller than 200 μm) may be recycled into the process according to the invention.

After the compression and/or during the fractionation, the slugs can be sintered in order to increase the solidity.

Determination of the Dust Content

The dust content is determined to DIN 55992-2.

Figure 3:
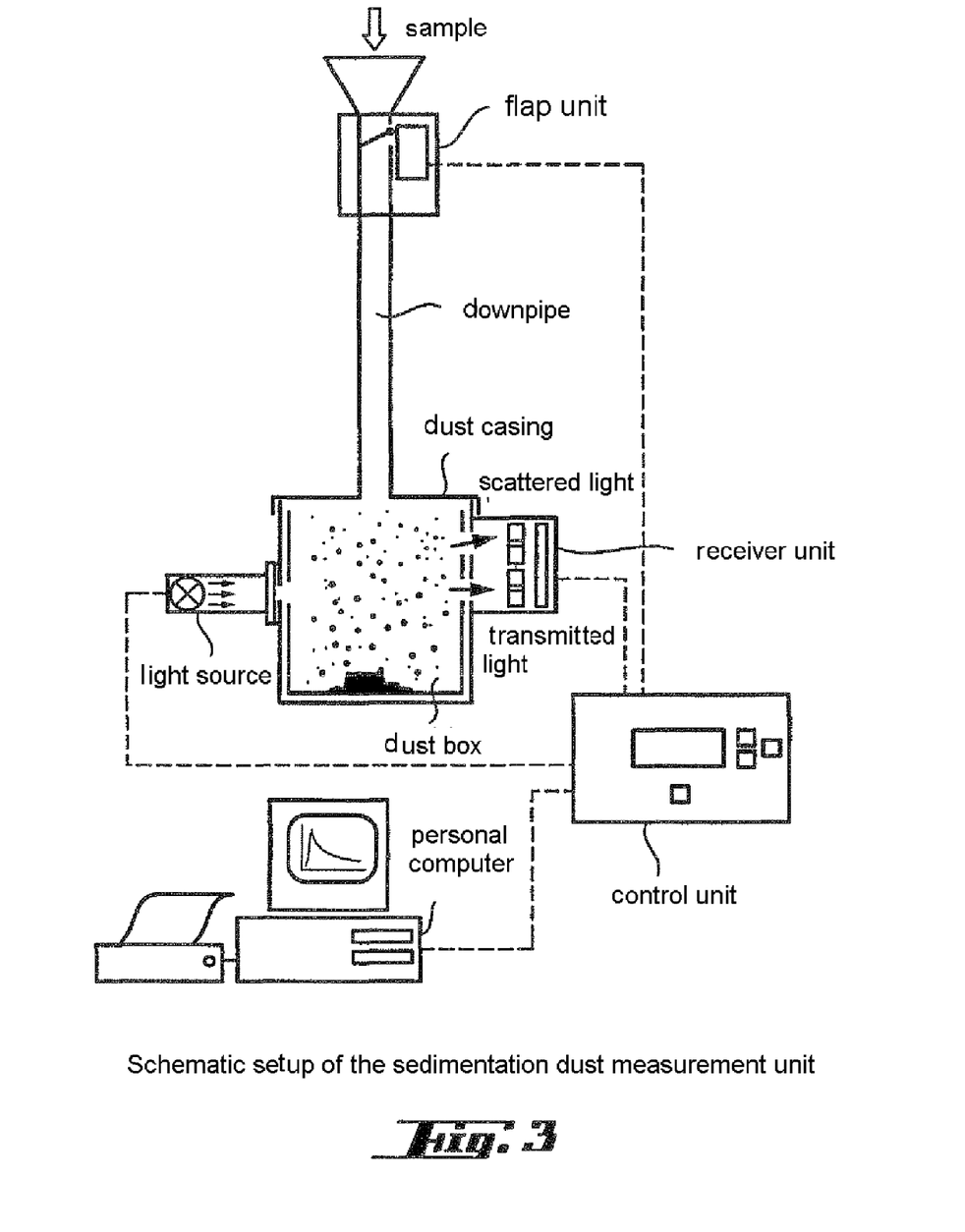

A schematic illustration of the apparatus used to determine the dust content is shown in FIG. 3.

To determine the dust content, a weighed amount (5 g) of the inventive slugs or of the comparative product according to DE 199 28 851 A1 is introduced into a charge system at the upper end of the downpipe. Before the start of the measurement, this is closed at the bottom by flaps. The end of the downpipe is closed. At the start of the measurement, this flap is opened for a particular time interval, so that the sample can fall into the downpipe. During the falling and when it hits the bottom of the downpipe, the sample releases dust into the air. The air currents during the falling ensure uniform distribution of the dust in the tube. Subsequently, the suspended matter begins to sediment. At the lower end of the downpipe, the light absorbance which is caused by the suspended matter is measured by a photometric sensor. The sedimentation is plotted in the form of the absorbance as a function of time by a PC. The absorbance is a measure of the relative particle concentration.

The integral dust values can be determined from the course of the absorbance against time. The integral dust values are determined from the measured sedimentation profile from a start time ta up to the end of the measurement after 30 s as follows:

$$I(ta) = \int_{to}^{30s} E(t)\,dt \tag{1}$$

where $ta = 1s, 2s, 4s, 8s, 16s$

These integral dust values describe the amount of dust released. The integral dust value between 16 s and 30 s is also known as "dust value". It includes fine dust information and is a measure of the fine dust content.

The integral dust value between 1 s and 30 s describes the total amount of dust which is composed of coarse and fine dust.

The pyrogenic titanium dioxide compressed in accordance with the invention to slugs has a lack of dust which is advantageous for all applications. It can be incorporated into mixtures without loss and without dust nuisance.

Even though the pyrogenic titanium dioxide has been compressed, the inventive slugs have sufficient redispersibility.

The pyrogenic titanium dioxide compressed in accordance with the invention to slugs has no binder.

The pyrogenic titanium dioxide compressed in accordance with the invention to slugs can be used without dust as an additive in cosmetics such as sunscreens, photocatalytic coatings, dyes, inorganic paint systems or as heat stabilizers in silicone, or as a raw material for the ceramic industry.

The pyrogenic titanium dioxide used is P25 titanium dioxide (AEROXID $TiO_2$ P25) with the physiochemical characteristics listed in Table 1. It is known from No. 56 of the "Pigmente" [Pigments] series of publications "Hochdisperse Metalloxide nach dem Aerosilverfahren" [High-dispersibility metal oxides by the Aerosil process], 4th Edition, February 1989, Degussa AG.

TABLE 1

|  | Titanium dioxide P25 |
|---|---|
| CAS reg. number | 13463-67-7 |
| Behaviour towards water | Hydrophilic |
| Appearance | Loose white powder |
| BET surface area[1] m$^2$/g | 50 ± 15 |
| Mean size of the primary particles nm | 21 |
| Tamped density[2] g/l | approx. 100 |
| Specific weight[10] g/ml | approx. 3.7 |
| Drying loss[3] on departure from the supplier (at 105° C. for 2 hours) % | <1.5 |
| Ignition loss[4)7] (2 hours at 1000° C.) | <2 |
| pH[5] (in 4% aqueous dispersion) | 3-4 |
| SiO$_2$[8] | <0.2 |
| Al$_2$O$_3$[8] | <0.3 |
| Fe$_2$O$_3$[8] | <0.01 |
| TiO$_2$[8] | >99.5 |
| ZrO2[8] | — |
| HfO2[8] | — |
| HCl[8)9] | <0.3 |
| Screen residue[6] (to Mocker, 45 μm) % | <0.05 |

[1] to DIN 66131
[2] to DIN ISO 787/XI, JIS K 5101/18 (not screened)
[3] to DIN ISO 787/II, ASTM D 280, JIS K 5101/21
[4] to DIN 55921, ASTM D 1208, JIS K 5101/23
[5] to DIN ISO 787/IX; ASTM D 1208; JIS K 5101/24
[6] to DIN ISO 787/XVIII; JIS K 5101/20
[7] Based on the substance dried at 105° C. for 2 hours
[8] Based on the substance calcined at 1000° C. for 2 hours
[9] HCl content is part of the glow loss
[10] Determined with an air pycnometer To prepare the titanium dioxides, a volatile titanium compound is sprayed into an explosive gas flame composed of hydrogen and air. In most cases, titanium tetrachloride is used. This substance hydrolyses under the influence of the water formed in the hydrogen/oxygen reaction to give titanium dioxide and hydrochloric acid. The titanium dioxide, after leaving the flame, enters a so-called coagulation zone in which the titanium dioxide primary particles and primary aggregates agglomerate. The product present as a kind of aerosol at this stage is separated from the gaseous accompanying constituents in cyclones and then aftertreated with moist hot air.

The particle sizes of the titanium dioxides can be varied with the aid of the reaction conditions, for example flame temperature, hydrogen or oxygen content, amount of titanium tetrachloride, residence time in the flame or length of the coagulation zone.

The BET surface area is determined with nitrogen to DIN 66 131.

The tamped volume is determined on the basis of ASTM D 4164-88.

Equipment: Engelsmann STA V 2003 tamping volumeter to DIN 53194, Section 5.2 b-f
Measuring cylinder 250 ml, marks every 2 ml
Balance with error limit max.±0.1 g.
Procedure:
Set the counter of the tamping volumeter to 1000 strokes.
Tare the measuring cylinder.
Fill granule into the measuring cylinder up to 250 ml mark. Note the weight (±0.1 g).
Clamp the measuring cylinder into the tamping volumeter and switch the instrument on.
End of tamping→instrument switches off automatically after 1000 strokes.
Read the tamped volume accurately to 1 ml.

Calculation:
E: Granule weight in g
V: Volume read off in ml
W: Water content in % by weight (determined to test method P001)

$$\text{Tamping density} = \frac{E \times (100 - W)}{V \times 100}$$

The pH is determined in 4% aqueous dispersion, and in 1:1 water:ethanol in the case of hydrophobic catalyst supports.

The pulverulent titanium dioxide was compressed with the Bepex roll compressor. No binders or water were added. The needle-like compactates were subsequently screen-granulated to a maximum particle size of 500 micrometers (fraction I). This granule was subsequently classified by means of screening into fraction II (200 micrometers<x<500 micrometers) and fractions III (100 μm<x<200 micrometers) and IV (0<x<100 micrometers).

The flow diagram of this process is shown in FIG. 4.

The conditions established are listed in Table 2.

TABLE 2

Process parameters of the granulation of the pyrogenic TiO$_2$ (AEROXIDE TiO$_2$ P25)

| Compressor | | |
|---|---|---|
| Type | | Bepex L200/50 |
| Roller form | | Grooved |
| Roller diameter | [mm] | 200 |
| Roller length | [mm] | 50 |
| Product supply into roller gap | | Screw (120/48) vertical |
| Compression | | |
| Roller speed | [rpm] | 2.9 |
| Peripheral roller speed | [m/s] | 0.03 |
| Spec. surface pressure | [kN/cmRL] | 0.6 |
| Speed of the metering screw | [rpm] | 95 |
| Capacity | [kg/h] | 17 |
| Screen granulation | | |
| Mesh size | [μm] | 500 |
| Capacity | [kg/h] | >17 |
| Screening step 1 (removal of the fraction with the particle size: 200 μm < x < 500 μm) | | |
| Mesh size of the screen | [μm] | 200 |
| Capacity | [kg/h] | 24.3 |
| Coarse material of the granule bed (200 μm < x < 500 μm) | [w %] | 61 |
| Fine material of the granule bed (0 < x < 200 μm) | [w %] | 39 |
| Screening step 2 (Classification of the granule bed with a particle size of: 0 μm < x < 200 μm) | | |
| Mesh size of the screen | [μm] | 100 |
| Coarse material (100 μm < x < 200 μm) | [w %] | 50 |
| Fine material (0 < x < 100 μm) | [w %] | 50 |

The sedimentation dust was determined with the Lorenz SP3 measurement apparatus.

The particle size distribution was determined by means of HORIBA-LA 920 for fractions III and IV and of AEROPERL P25/20. To this end, the granules were dispersed in water and then analysed immediately.

The particle size distribution of the coarser fraction II was determined by means of the CAMSIZER from Retsch Technology.

Results:

The intention was to attempt, with fractions III and IV, to obtain a granule which has a particle size distribution similar to the titanium dioxide granule known from DE 199 28 851.

It was expected that the preparation of the titanium dioxide compactate by means of the compressing process according to the invention would be significantly less expensive than by the known processes by means of spray-drying, because at least the thermal and hence energy-intensive step of spray-drying would be dispensed with.

FIG. 5 shows the particle size distribution of the spray-dried titanium dioxide granule AEROPERL P25/20 and that of the $TiO_2$ granule fraction IV. It can be seen therefrom that the granule fraction IV has a slightly wider particle size distribution than AEROPERL P25/20.

FIG. 6 shows the particle size distribution of granule fraction II.

FIG. 7 shows the particle size distribution of granule fraction III.

The granule fraction II is characterized by the excellent flow behaviour and the extreme lack of dust.

The dusting behaviour and hence the extreme lack of dust of the granule fraction II with a granule size of 200 μm<x<500 μm can be taken from FIG. 5, in which the dust is virtually completely sedimented.

The great decline in the absorbance, which is a measure of the relative dust concentration, in the range I shows the rapid sedimentation.

A low absorbance in the range II after 20 or 30 seconds shows a low fines content, especially because virtually no particles remain suspended for a prolonged period.

It is thus found that not only the coarser granule having a particle size between 200 and 500 micrometers but also the fine granule fraction with a similar particle size distribution, such as AEROPERL $TiO_2$ P25/20, has a significantly lower dust content.

It is possible by the process according to the invention to increase the tamped density of the pyrogenic titanium dioxide P25 by more than five times.

The pulverulent pyrogenic $TiO_2$ P25 has a tamped density of 130 g/l.

The spray-dried pyrogenic titanium dioxide AEROPERL P25/20 has a tamped density of 730 g/l.

Table 3 shows the tamped and bulk densities of the granules of the pyrogenic titanium dioxide P25 produced in accordance with the invention.

TABLE 3

Bulk and tamped density of various granule fractions and of the starting material AEROXIDE $TiO_2$ P25

| | Fraction I Granule 0 < x < 500 μm | Fraction II Granule 200 < x < 500 μm | Fraction III Granule 100 < x < 200 μm | Fraction IV Granule 0 < x < 100 μm |
|---|---|---|---|---|
| Bulk density [g/l] | 565 | 602 | 502 | 436 |
| Tamped density [g/l] | 678 | 702 | 606 | 605 |

FIG. 8 shows the comparison of the dusting behaviour of inventive slugs with the dusting behaviour of known titanium dioxide granules according to DE 199 28 851 A1.

FIG. 9 shows the comparison of the particle size distribution of the inventive slugs with the particle size distribution of the known granule P25/20 according to DE 199 28 851 A1 after an ultrasound treatment.

The invention claimed is:

1. A pyrogenic titanium dioxide crushed slug having tamped density (to DIN EN ISO 787-11) of from 500 to 1200 g/l and a particle size greater than 200 μm and less than or equal to 20 mm.

2. A process for preparing the pyrogenic titanium dioxide crushed slug according to claim 1, comprising optionally preliminarily deaerating pyrogenic titanium dioxide, compressing the optionally deaerated pyrogenic titanium dioxide to form a slug, crushing the slug, and optionally classifying the crushed slug.

3. The process for preparing the pyrogenic titanium dioxide compressed slug according to claim 2, wherein the pyrogenic titanium dioxide is precompressed.

4. An additive comprising the pyrogenic titanium dioxide crushed slug according to claim 1.

5. A pyrogenic titanium dioxide crushed slug prepared by a process comprising optionally preliminarily deaerating pyrogenic titanium dioxide, roll compressing the optionally deaerated pyrogenic titanium dioxide to form a slug, crushing the slug, and optionally classifying the crushed slug, wherein the crushed slug has a tamped density (to DIN EN ISO 787-11) of from 500 to 1200 g/l.

6. The pyrogenic titanium dioxide crushed slug according to claim 5, wherein the pyrogenic titanium dioxide is precompressed.

7. The pyrogenic titanium dioxide crushed slug of claim 1, wherein said slug has a tamped density (to DIN EN ISO 787-11) of from 600 to 800 g/l.

8. The pyrogenic titanium dioxide crushed slug of claim 5, wherein said crushed slug has a tamped density (to DIN EN ISO 787-11) of from 600 to 800 g/l.

9. The pyrogenic titanium dioxide crushed slug of claim 5, wherein said crushed slug has a particle size of from 0 to 500 μm.

10. The pyrogenic titanium dioxide crushed slug of claim 5, wherein said crushed slug has a particle size of from 100 to 200 μm.

11. The process for preparing a pyrogenic titanium dioxide crushed slug according to claim 2, wherein the deaerating is effected by sedimentation.

12. The pyrogenic titanium dioxide crushed slug according to claim 5, wherein the deaerating is effected by sedimentation.

13. The pyrogenic titanium dioxide crushed slug of claim 5, wherein said crushed slug has a particle size greater than 200 μm and less than or equal to 20 mm.

* * * * *